No. 732,691. PATENTED JULY 7, 1903.
B. J. ABBOTT.
WORK HOLDER FOR DIE CUTTING MACHINES.
APPLICATION FILED MAR. 8, 1902.
NO MODEL. 2 SHEETS—SHEET 1.
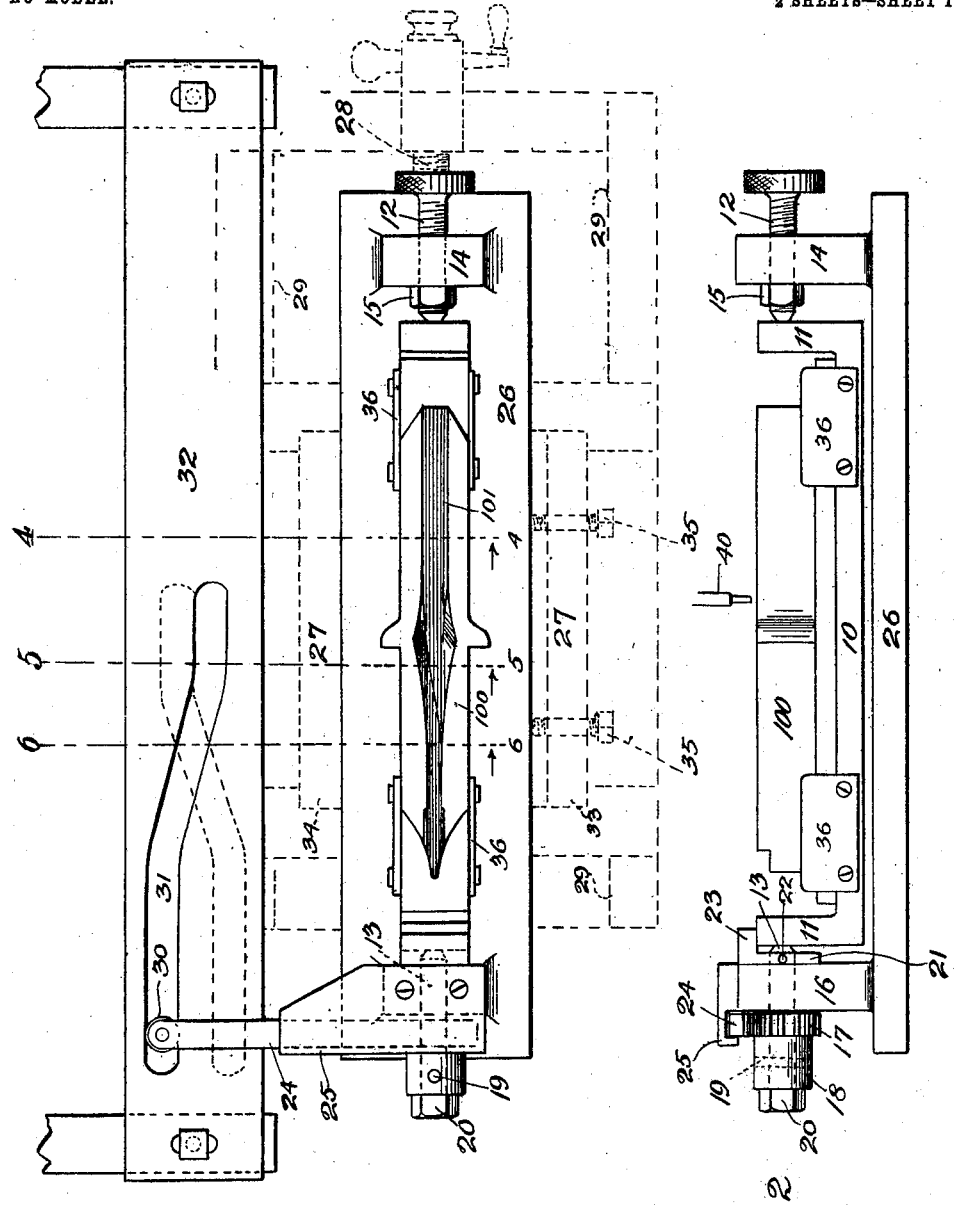
WITNESSES:
F. B. Townsend
N. W. M. Munday
INVENTOR.
Benjamin Judd Abbott.
BY
Munday, Evarts & Adcock
ATTORNEYS No. 732,691. PATENTED JULY 7, 1903.
B. J. ABBOTT.
WORK HOLDER FOR DIE CUTTING MACHINES.
APPLICATION FILED MAR. 8, 1902.
NO MODEL. 2 SHEETS—SHEET 2.
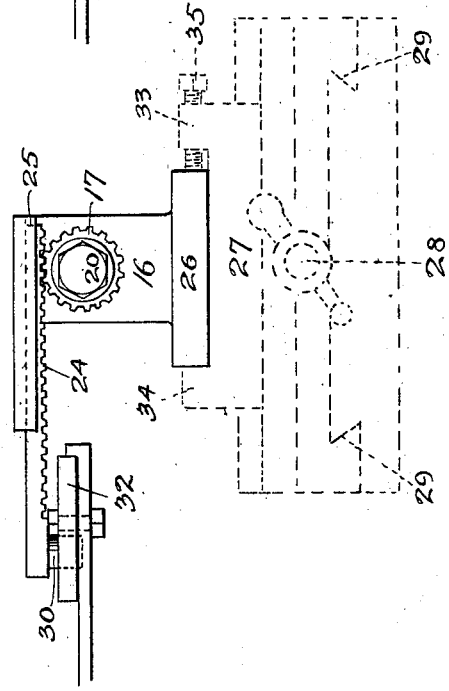
WITNESSES:
F. B. Townsend
INVENTOR.
Benjamin Judd Abbott.
BY
Munday, Evarts & Adcock.
ATTORNEYS No. 732,691. Patented July 7, 1903.

UNITED STATES PATENT OFFICE.

BENJAMIN JUDD ABBOTT, OF CHICAGO, ILLINOIS, ASSIGNOR TO UNION HORSE NAIL COMPANY, OF CHICAGO, ILLINOIS, A CORPORATION OF CONNECTICUT.

WORK-HOLDER FOR DIE-CUTTING MACHINES.

SPECIFICATION forming part of Letters Patent No. 732,691, dated July 7, 1903.

Application filed March 8, 1902. Serial No. 97,244. (No model.)

*To all whom it may concern:*

Be it known that I, BENJAMIN JUDD ABBOTT, a citizen of the United States, residing in Chicago, in the county of Cook and State of Illinois, have invented a new and useful Improvement in Work-Holders for Die-Cutting Machine, of which the following is a specification.

This invention relates to the construction of die-cutting machines, and more especially to the work-holding parts thereof.

The object of the invention has been to devise a work-holder which will be available in cutting spiral or twisting forms of dies.

The nature of the invention will be fully understood from the description given below and from the accompanying drawings, forming a part thereof, and in which latter—

Figure 1 is a plan view of the invention. Fig. 2 is a front elevation of the invention. Fig. 3 is a side elevation of the invention. Figs. 4, 5, and 6 are sections on the lines 4 4, 5 5, and 6 6, respectively, of Fig. 1. Fig. 7 is an end view of two die-blocks cut in the machine.

In said drawings, 100 represents a die-block, in which is cut the design 101, which is spiral for a portion of its length. Two of these blocks are shown placed together at Fig. 7, the designs being upon the abutting faces and together forming a twisted or spiral passage-way through the united blocks, one end of the passage being shown in full lines in said figure and the other end being shown in broken lines. The machine has been devised especially for work of this character, and it may be used in cutting any spiral or twisted design.

The die-block to be cut is secured in a swinging frame consisting of a platform 10 and upturned ends 11 11, and the latter receive the points of pivots 12 and 13, upon which the frame rocks, the pivots engaging the ends in a plane above that of the platform. Of these pivots the one indicted at 12 is stationary, though it is longitudinally adjustable in the standard 14, being threaded therein and provided with a jam-nut 15 to hold it in its adjusted positions. The other pivot is supported in a standard 16 and is passed axially through a pinion 17 outside the standard and having a hub 18. A pin 19 is passed through the hub and pivot, so that the latter turns with the pinion, and a nut 20 holds the pinion upon the pivot. On the end of the pivot inside the standard is a block 21, keyed fast to the pivot by the pin 22 and having an overhanging lip or flange 23, located immediately over the top of the adjacent upturned end 11 of the swinging frame. From the construction thus far detailed it will be seen that when the pinion is rotated the pivot 13 turns with it and that through the medium of the flanged block 21 the pivot 13 will swing the frame 10, the direction and extent of the swinging movement depending upon the direction and extent of the rotation imparted to the pinion.

For the purpose of imparting the turning or oscillatory movements to the pinion a rack 24 is employed. It is arranged transversely of the work-holder and meshes with the pinion and is confined in its position thereon by the overhanging housing 25, formed on top of standard 16. The standards 14 and 16 are mounted upon a plate 26, which is supported upon a carriage 27, movable longitudinally by the feed-screw 28 on ways shown at 29. In the longitudinal movements received from the feed-screw or other suitable means a roller 30 on the farther end of the rack 24 is made to traverse a cam-groove 31 in a stationary plate 32, located at the side of the carriage 27. The cam-groove is fashioned to suit the work in hand, being adapted to make the spiral abrupt or gradual, as desired, and is of a length equal to the spiral portion of the cut. It acts to force the rack longitudinally over the pinion while the carriage is traveling to and fro, thereby turning the pinion and causing the rocking of the work-holding frame. The frame is shown in different positions in Figs. 4, 5, and 6. The plate 26 is laterally adjustable, being confined between abutments 33 and 34 on the carriage and held by set-screws 35.

The work is secured to the platform by side plates 36 on the latter and by one or more screws 37, passing up through the platform into the die-block. The cam-plate 32 may be used either side up, and if reversed it will impart reversed movements to the work-holder, as will be understood from the broken lines in Fig. 1. The work-holder is readily removed by loosening pivot 12.

The cutting-tool and its rotating and supporting devices may be of any suitable construction. The tool appears at 40 in some of the figures and is stationarily located; but I have not thought it necessary to illustrate its supporting or actuating devices.

I claim—

The combination with a milling-tool, of a work-holder consisting of a longitudinally-movable swinging frame pivotally supported at its ends, a guide-cam, a pinion secured to one of the frame-pivots, a rack meshing with said pinion and controlled by said cam, and a block fast on the same pivot and having a projection engaging the frame, substantially as specified.

BENJAMIN JUDD ABBOTT.

Witnesses:
EDW. S. EVARTS,
H. M. MUNDAY.